(12) United States Patent
Matsumoto et al.

(10) Patent No.: US 7,297,887 B2
(45) Date of Patent: Nov. 20, 2007

(54) TOUCH PANEL

(75) Inventors: Kenichi Matsumoto, Osaka (JP); Koji Tanabe, Osaka (JP); Shoji Fujii, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 81 days.

(21) Appl. No.: 11/368,771

(22) Filed: Mar. 6, 2006

(65) Prior Publication Data

US 2006/0209048 A1    Sep. 21, 2006

(30) Foreign Application Priority Data

Mar. 15, 2005    (JP)  ............... 2005-072541

(51) Int. Cl.
*H01H 9/00*   (2006.01)

(52) U.S. Cl. .................. 200/314; 200/512; 345/173

(58) Field of Classification Search ............... 200/5 A, 200/600, 512, 310, 314; 341/20, 22, 33, 341/34; 345/156, 168–170, 173, 176
See application file for complete search history.

(56) References Cited

U.S. PATENT DOCUMENTS 5,243,162 A * 9/1993 Kobayashi ............... 200/512
6,034,335 A * 3/2000 Aufderheide et al. ....... 200/5 A
6,563,435 B1 * 5/2003 Platz ......................... 341/34
6,680,448 B2 * 1/2004 Kawashima et al. ........ 200/310
6,831,241 B2 * 12/2004 Fukui et al. ................. 200/512

FOREIGN PATENT DOCUMENTS

JP    2003-280821    10/2003

* cited by examiner

*Primary Examiner*—Michael A Friedhofer
(74) *Attorney, Agent, or Firm*—RatnerPrestia

(57) ABSTRACT

A touch panel which is constituted by using an adhesive layer having a thickness which is 70% or more of a thickness of an approximately picture-frame-like spacer which allows respective outer peripheries of an upper substrate and a lower substrate to adhere to each other is provided. Due to such a constitution, when the touch panel is used under high temperature or in an environment where the temperature difference is severely large so that the thermal expansion or shrinkage is generated on upper substrate or lower substrate, these thermal expansion and shrinkage can be absorbed by the thick and soft adhesive layer. As a result, it is possible to suppress the peeling-off of upper and lower substrates thus realizing a surely manipulable touch panel.

4 Claims, 1 Drawing Sheet

TOUCH PANEL

The present invention relates to a touch panel which is used in various electronic apparatus.

BACKGROUND OF THE INVENTION

Recently, in the various electronic apparatus such as mobile telephones and car navigation systems, a light-transmitting touch panel is disposed in front of a display device such as liquid crystal or the like. Further, the number of apparatus which can perform the recognition and the selection of characters and symbols shown in the display device through the touch panel and can change over various functions thereof by manipulating the touch panel by pushing using a finger, a dedicated pen or the like is increased. Under such circumstances, there has been a demand for a touch panel which can be manufactured at a low cost and can be surely manipulated. A conventional touch panel is explained in conjunction with FIG. 2. Here, to facilitate the understanding of the constitution of the touch panel, a size of the touch panel in the thickness direction is expressed in an enlarged manner.

In FIG. 2, light-transmitting upper conductive layer 3 made of Indium-Tin-Oxide or the like is formed on a lower surface of film-like light-transmitting upper substrate 1. On an upper surface of light-transmitting lower substrate 2 made of glass or the like, lower conductive layer 4 substantially equal to upper conductive layer 3 is formed. Further, on an upper surface of lower conductive layer 4, a plurality of dot spacers (not shown in the drawing) are formed at a predetermined interval using an insulating resin. A pair of upper electrodes (not shown in the drawing) is formed on both ends of upper conductive layer 3. A pair of lower electrodes (not shown in the drawing) is formed on both ends of lower conductive layer 4 in the direction orthogonal to the upper electrodes.

Further, with respect to approximately picture-frame-like spacer 5, respective outer peripheries of upper substrate 1 and lower substrate 2 are adhered to each other by adhesive layers 5B, 5C which are formed on upper and lower surfaces of film-like base member 5A by coating. In this manner, the touch panel is constituted in a state that upper conductive layer 3 and lower conductive layer 4 face each other with a predetermined gap there between. Spacer 5 is constituted such that to upper and lower surfaces of film-like base member 5A having a thickness of approximately 50 µm, adhesive layers 5B and 5C having a thickness of approximately 25 µm are applied. The whole thickness of 100 µm of spacer 5 is set to become the gap between upper conductive layer 3 and lower conductive layer 4.

Further, the touch panel having such a constitution is mounted on an electronic apparatus in a state that the touch panel is disposed in front of a liquid crystal display device (LCD) or the like and, at the same time, a pair of upper electrode and lower electrode are connected with an electronic circuit (not shown in the drawing) of the apparatus.

In the above-mentioned constitution, when the user manipulates an upper surface of upper substrate 1 by pushing using his/her finger, the pen or the like while observing a display on an LCD or the like at the back of the touch panel with naked eyes, upper substrate 1 is deflected and upper conductive layer 3 at the pushed portion is brought into contact with lower conductive layer 4. Further, voltages are sequentially applied to upper electrodes and lower electrodes from an electronic circuit, the electronic circuit detects the pushed portion based on the voltage ratio between these electrodes, and performs the change over of various functions of the apparatus.

Here, the touch panel having such constitution is disclosed in JP-A-2003-280821.

When the above-mentioned conventional touch panel is used in an electronic apparatus such as a mobile telephone used outdoors or a car navigation system which is mounted on a front portion of a cabin of an auto mobile, there may arise following drawbacks. Particularly, when the touch panel is used under a high temperature or in an environment where the temperature difference is severely large, due to the thermal expansion or shrinkage generated on upper substrate 1 or lower substrate 2, there exists a possibility that the peeling-off between spacer 5 and upper substrate 1 is generated thus making the manipulation of the touch panel unreliable.

SUMMARY OF THE INVENTION

A touch panel of the present invention comprises a light-transmitting upper substrate which forms an upper conductive layer on a lower surface thereof, a light-transmitting lower substrate which forms a lower conductive layer which faces the upper conductive layer with a predetermined gap there between on an upper surface thereof, and a picture-frame like spacer which is formed of a base member and an adhesive layer which is formed on upper and lower surfaces of the base member, wherein the spacer is adhered to outer peripheries of the upper substrate and the lower substrate and, at the same time, a thickness of the adhesive layer is 70% or more of a thickness of the spacer. In this manner, by forming the adhesive layer of the spacer to have a large thickness, even when the touch panel is used under a high temperature or an environment where the temperature difference is severely large so that thermal expansion or shrinkage is generated on the upper substrate or the lower substrate, a size change, warping and the like of the upper substrate and the lower substrate can be absorbed by the thick and soft adhesive layers. As a result, it is possible to provide the touch panel which can suppress the peeling-off of the upper and lower substrates thus realizing the reliable manipulation.

DETAILED DESCRIPTION OF THE PREFERRED EMBODIMENT

Figure 1:
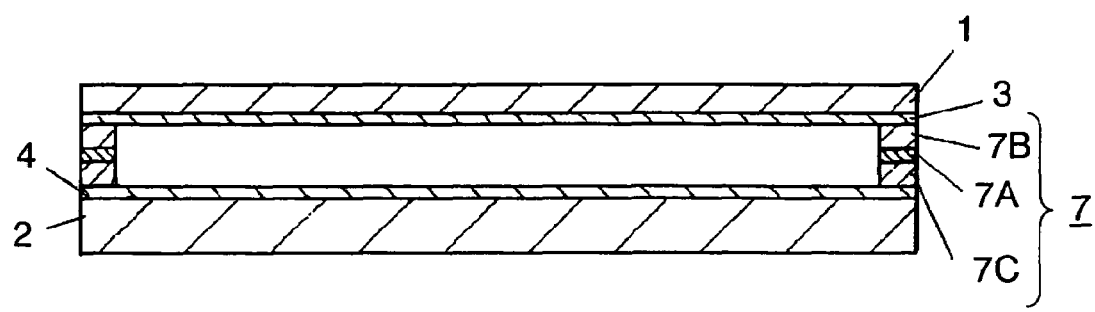
Fig. 1 is a cross-sectional view of a touch panel according to one embodiment of the present invention.
Figure 2:
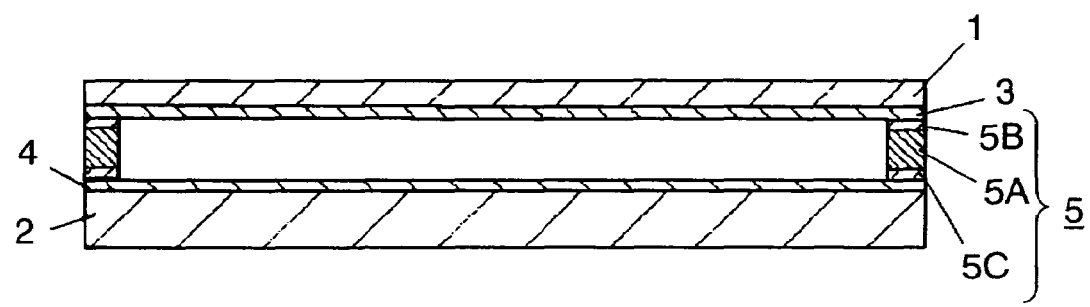
FIG. 2 is a cross-sectional view of a conventional touch panel.

Hereinafter, an exemplary embodiment of the present invention is explained referring to FIG. 1.

The drawing is a schematic view and is not provided to accurately indicate the respective positions dimensionally. Further, to facilitate the understanding of the constitution, the size in the thickness direction is expressed in an enlarged manner. Still further, the constitution which is identical with the constitution explained in the paragraph "BACKGROUND OF THE INVENTION" is given same symbols and their explanation is simplified.

Embodiment

As shown in FIG. 1, film-like light-transmitting upper substrate 1 is made of polyethylene terephthalate (PET), poly carbonate (PC) or the like. Lower substrate 2 is formed of a light-transmitting material such as glass, an acrylic resin, PC. On a lower surface of upper substrate 1, light-transmitting upper conductive layer 3 made of Indium Tin Oxide, Tin Oxide or the like is formed by a sputtering method or the like. In the same manner, light-transmitting lower conductive layer 4 is formed on an upper surface of lower substrate 2.

Further, a plurality of dot spacers (not shown in the drawing) are formed on an upper surface of lower conductive layer 4 at a predetermined interval using an insulating resin such as an epoxy resin or a silicone resin. A pair of upper electrodes (not shown in the drawing) made of silver, carbon or the like are formed on both ends of upper conductive layer 3, while a pair of lower electrodes (not shown in the drawing) are respectively formed on both ends of lower conductive layer 4 in the direction orthogonal to the upper electrodes.

Further, approximately picture-frame-like spacer 7 is constituted of base member 7A and adhesive layers 7B, 7C which are formed on upper and lower surfaces of base member 7A by coating. Respective outer peripheries of upper substrate 1 and lower substrate 2 are adhered to spacer 7 using adhesive layers 7B, 7C.

Here, it is preferable that base member 7A has an elasticity of $10^9$ dyne/cm$^2$ and a thickness of approximately 10-30 μm. As an example of a material of base member 7A, a nonwoven fabric, a polyester film or the like is named. Further, it is preferable that adhesive layers 7B, 7C have an elasticity of $10^3$-$10^5$ dyne/cm$^2$ and a thickness of approximately 35-45 μm. As an example of a material of adhesive layers 7B, 7C, acrylic-based resin, butyl rubber, nitrile rubber, chloroprene rubber, silicone rubber or the like is named.

That is, using adhesive layers 7B and 7C which are formed with the thickness which is 70% or more of the total thickness of spacer 7 of approximately 100 μm, the outer peripheries of upper substrate 1 and lower substrate 2 are bonded. Simultaneously, upper conductive layer 3 and lower conductive layer 4 are arranged to face each other with a predetermined gap of approximately 100 μm there between thus constituting the touch panel.

The touch panel having such a constitution is mounted on an electronic apparatus in a state that the touch panel is disposed in front of a LCD or the like and, at the same time, a pair of upper electrode and lower electrode are connected to an electronic circuit (not shown in the drawing) of the apparatus.

In the above-mentioned constitution, when a user manipulates an upper surface of upper substrate 1 using his/her finger or a pen while observing a display of the LCD or the like at the back of the touch panel with naked eyes, upper substrate 1 is deflected and upper conductive layer 3 at a pushed portion thereof is brought into contact with lower conductive layer 4.

Further, voltages are sequentially applied to the upper electrode and the lower electrode from the electronic circuit, and the electronic circuit detects the pushed portion based on a voltage ratio between these electrodes and hence, various functions of the apparatus are changed over.

When such a touch panel is used in the electronic apparatus such as a mobile telephone used outdoors or a car navigation system mounted on a front portion of a cabin of an automobile and, particularly, when the electronic apparatus is used under high temperature or in an environment where the temperature difference is severely large, the thermal expansion or shrinkage is generated on upper substrate 1 and lower substrate 2. Due to such thermal expansion or shrinkage, the dimensional change, the warping or the like arises in upper substrate 1 and lower substrate 2. However, adhesive layers 7B, 7C which are adhered to upper substrate 1 and lower substrate 2 have the large thickness which amounts to 70% or more of the thickness of whole spacer 7 as mentioned above and hence, thick and soft adhesive layers 7B, 7C exhibit the elastic deformation. As a result, the dimensional change, the warping and the like of upper substrate 1 and lower substrate 2 are absorbed thus suppressing the peeling-off of the upper and lower substrates.

Further, the elasticity of adhesive layers 7B, 7C is $10^3$-$10^5$ dyne/cm$^2$ and hence, adhesive layers 7B, 7C exhibit excellent flexibility and resiliency compared to base member 7A having the elasticity of approximately $10^9$ dyne/cm$^2$, upper substrate 1 and lower substrate 2. As a result, it is possible to further suppress the peeling-off of the upper and lower substrates thus ensuring the reliable manipulation of the touch panel.

In this manner, according to this embodiment, out of the total thickness of approximately picture-frame-like spacer 7 which allows the outer peripheries of upper substrate 1 and lower substrate 2 to adhere to each other, the thickness of 70% or more is constituted by the thickness of adhesive layers 7B, 7C. As a result, even when the touch panel is used under a high temperature or in an environment where the temperature difference is severely large so that the thermal expansion or shrinkage is generated on upper substrate 1 and lower substrate 2, the thick and soft adhesive layers 7B, 7C can absorb the thermal expansion and shrinkage. That is, even under the severe environment, it is possible to suppress the peeling-off of the upper and lower substrates thus realizing the touch panel which can be surely manipulated.

Further, in the present invention, the elasticity of adhesive layers 7B, 7C is set to $10^3$-$10^5$ dyne/cm$^2$. In this manner, by allowing adhesive layers 7B, 7C to possess the excellent resiliency within a range which is neither too soft nor too hard, it is possible to surely prevent the peeling-off of the upper and lower substrates. Further, by allowing adhesive layers 7B, 7C to be thick and soft, it is possible to obtain following advantageous effects. That is, even when the user performs the manipulation by pushing the upper surface of upper substrate 1 at a position away from the center and in the vicinity of spacer 7, that is, when the user performs the so-called end pushing manipulation, adhesive layers 7B, 7C are elastically deformed in the vertical direction in response to the deflection of upper substrate 1. In this manner, to attenuate a stress of upper conductive layer 3 which is deflected together with upper substrate 1, it is possible to prevent the rupture of upper conductive layer 3 attributed to the repeated manipulation.

Here, in place of using spacer 7 which forms adhesive layers 7B, 7C on upper and lower surfaces of base member 7A by coating as described above, it is possible to obtain the substantially equal advantageous effects by adhering upper and lower substrates using only thick adhesive materials having no base member. However, the spacer which is formed of only the adhesive material is liable to be easily deformed and hence, it is difficult to perform an operation to adhere the upper and lower substrates or the like.

The present invention provides the touch panel which can be manufactured at a low cost and can ensure the reliable manipulation. Further, the touch panel can be widely used for manipulating various electronic apparatus.

What is claimed is:

1. A touch panel comprising:
   a light-transmitting upper substrate which forms an upper conductive layer on a lower surface thereof;
   a light-transmitting lower substrate which forms a lower conductive layer which faces the upper conductive layer with a predetermined gap therebetween on an upper surface thereof; and
   a picture-frame like spacer which is formed of a base member and an adhesive layer which is formed on upper and lower surfaces of the base member, wherein the spacer is adhered to outer peripheries of the upper substrate and the lower substrate and, at the same time, a thickness of the adhesive layer is 70% or more of a thickness of the spacer.

2. The touch panel according to claim 1, wherein an elasticity of the adhesive layer is $10^3$ to $10^5$ dyne/cm$^2$.

3. The touch panel according to claim 2, wherein the adhesive layer is made of acrylic-based resin or rubber-based resin material.

4. The touch panel according to claim 1, wherein the base material is formed of either one of nonwoven fabric or a polyester film.

* * * * *